IMAGE MOUNT

Filed Oct. 9, 1952

INVENTOR.
John H. Grotthuss
BY Thiess, Olson & Mecklenburger.
Attys.

2,736,975
Patented Mar. 6, 1956

2,736,975

IMAGE MOUNT

John H. Grotthuss, Glenview, Ill.

Application October 9, 1952, Serial No. 313,915

3 Claims. (Cl. 40—152)

This invention relates to an image mount and more particularly to a mount for stereoscopic film when viewing the latter with a conventional three dimensional projector or viewer.

In photographing an object in three dimensions with present day so-called stereo-cameras, the object is photographed simultaneously through dual lenses which are mounted in parallel relation with respect to one another and spaced from 63 to 69.5 millimeters apart depending upon the make of the camera. The dimension 65 millimeters is perhaps the most common one found on cameras of this type and has been found to represent the interpupillary distance of an average adult. With the lenses arranged as such, it is believed the lenses, when photographing, simulate to the greatest extent, what is seen by a pair of human eyes. Because of the fact that the lenses are in a fixed parallel relation, the desired simulated effect sought to be obtained with the camera does not hold true particularly when the object being photographed is close to the camera, for example three feet or less. When an object at such a distance is observed through a pair of human eyes, the pupils normally converge a slight amount, thereby affording proper perspective of the object. To compensate for this non-convergence of the lenses, it is necessary that the pair of transparencies or negatives be properly positioned in spaced relation on the mount so that the desired simulated effect will be accomplished and comfortable viewing of the transparencies will result when either observing the transparencies through a stereoscope or seeing the transparencies projected by a stereoptical projector on a screen. Stereoscopes and stereoptical projectors are commonly referred to today in the industry as stereo viewers and stereo projectors respectively. If the pair of transparencies are not properly spaced with respect to one another in the mount, severe eye strain is experienced by the person observing the transparencies. Thus, it is of utmost importance in order to correctly position the transparencies in a mount, that the approximate range at which the principal object was photographed be known. It has been found through practice that correct mounting is obtained when a point on the most distant object pictured in one of the transparencies is spaced 65 millimeters apart with respect to the corresponding point on the same object in the other transparency. Thus, when mounting transparencies taken at close range—that is 3 feet or less—the distance between centers of the transparencies will be more than 65 millimeters, for example 69 millimeters. When, however, the principal object being photographed in three dimensions, is at a range of approximately 12 feet, the distance between centers of the transparencies should be approximately 67 millimeters. Thus it is to be noted that as the range from the camera to the principal object increases, the three dimensional effect diminishes and therefore the spacing between the centers of the transparencies approach the 65 millimeter dimension.

Various mounts for stereoscopic film have heretofore been proposed. However, due to the fact that the distance between the apertures or masks, over which the transparencies are positioned, is a fixed dimension, such mounts are not suitable for mounting sets of transparencies in which the distance between the principal object and the camera varies over a wide range. Thus, with such mounts it was necessary that several size mounts be used wherein the distances between the apertures were not the same. The added cost involved in having such a selection of mounts, plus the care required in selecting the proper mount for a particular pair of transparencies are but a few of the shortcomings associated with the prior mounts. Furthermore, these mounts were either too bulky or weighty in design, were not suited for use in stereoptical projectors because the material, which was used as a protective cover for the transparencies, caused considerable distortion of the projected image, or else failed to provide proper protection for the transparencies against scratching or finger imprints.

Thus it is one of the objects of the invention to provide a mount for stereoscopic film which enables the spacing between the centers of a pair of transparencies to be properly adjusted in accordance with the distance the principal object being photographed is from the camera.

It is a further object of this invention to provide a mount for stereoscopic film in which only a single mount is required for properly mounting various sets of transparencies regardless of the fact that the range from the principal object being photographed to the camera is different for each set of transparencies.

It is a still further object of this invention to provide a mount for stereoscopic film which is simple, lightweight, yet sturdy in construction, effective in operation, and inexpensive to produce.

Further and additional objects will appear from the description, accompanying drawings, and appended claims.

In accordance with one embodiment of this invention a mount is provided comprising an apertured, substantially flat body member, and an apertured frame piece detachably mounted on said body member so that the apertures of said body member and frame piece are in registered relation. Mounted on the frame piece are guide means which are adapted to project into a body member aperture and engage the aperture-forming edge portion of the body member to effect a substantially fixed relation between said body member and said frame piece.

For a more complete understanding of this invention reference should be made to the drawings wherein.

Figures 1, 2, 3, 4, 5, 6, 7, 8:
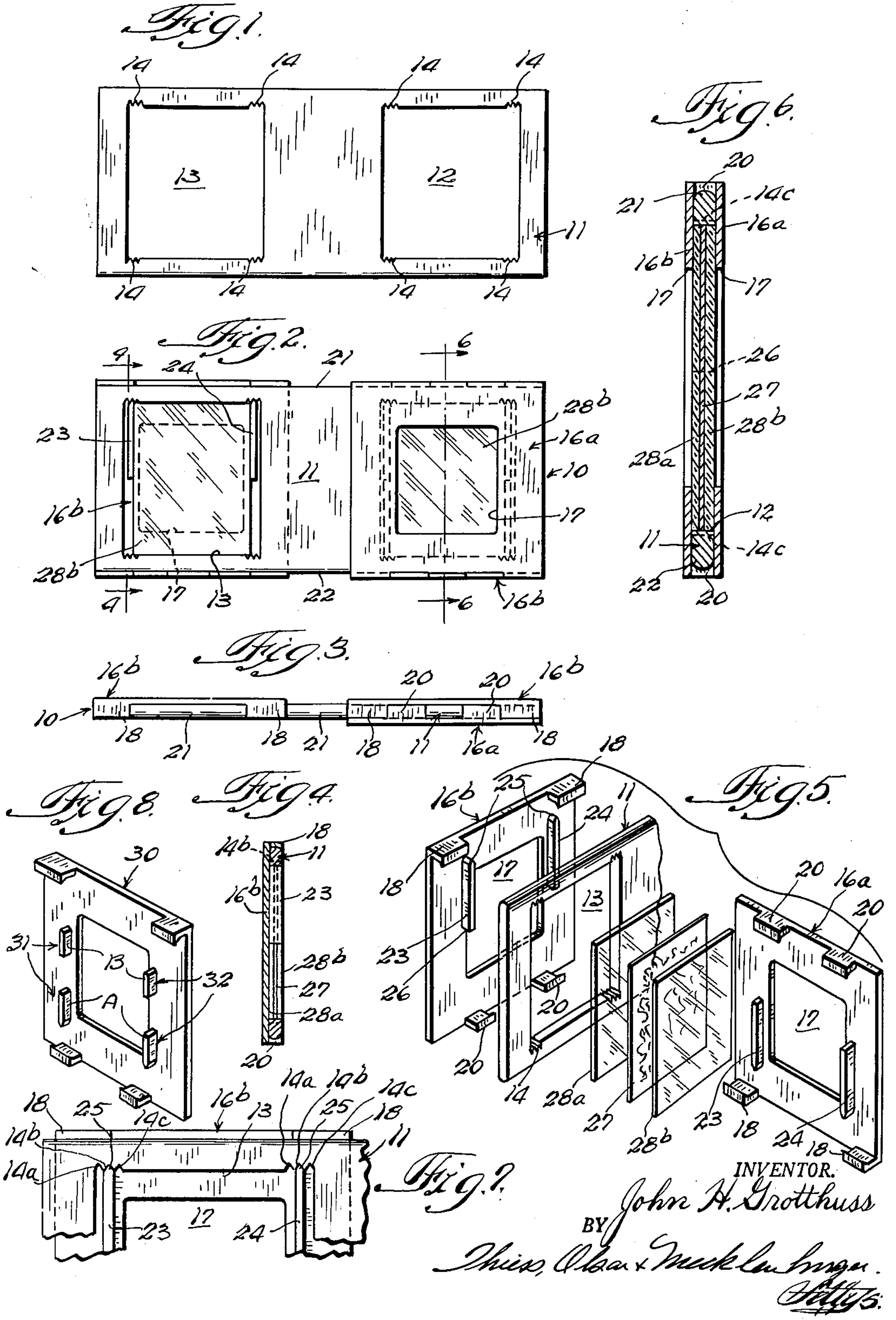
Figure 1 is a front view of the body member forming a part of the mount.
Figure 2 is a front view of the mount assembled with one of the left-hand frame pieces removed.
Fig. 3 is a top plan view of the mount shown in Fig. 2.
Fig. 4 is a sectional view taken along line 4—4 of Fig. 2.
Fig. 5 is a fragmentary exploded view of the mount.
Fig. 6 is an enlarged sectional view of the mount taken along line 6—6 of Fig. 2.
Fig. 7 is a fragmentary enlarged front view of the left-hand side of the mount shown in Fig. 2.
Fig. 8 is a perspective view of a modified form of frame piece.

Referring now to the drawings, an image mount 10 adapted primarily for use with stereoscopic film is shown comprising an elongated substantially flat body member 11 formed of a sturdy inexpensive material such as plastic. The body member 11 has formed therein a pair of identical relatively large apertures 12 and 13 which, in this instance, are rectangular in shape and whose centers are spaced apart approximately 65 millimeters. The upper and lower corner portions 14 of the peripheral edge of each aperture is provided with a plurality of serrations 14a, 14b, and 14c. The function of such serrations will be discussed in detail hereinafter. The body member 11 is formed of an opaque material so that, when the mount is placed in a viewer, only the light rays may pass through the apertures 12 and 13.

Cooperating with each aperture 12 and 13 are a pair of detachable frame or masking pieces 16a and 16b which, likewise, may be formed of a suitable opaque material such as plastic. All of the frame pieces are of like construction and, when the complemental frame pieces of a pair are mounted in place on the body member 11, one of said pieces is inverted with respect to the other, as seen more clearly in Figs. 2 and 5 so that the transversely extending body member-holding tabs 18 and 20 arranged about the periphery of each piece will not interfere with each other.

Each frame piece is provided with a centrally disposed aperture 17 which is of such size that only the proper amount of transparency shows therethrough. Furthermore the aperture 17 is considerably smaller than the corresponding body member aperture, so that regardless of the adjustment of the pairs of frame pieces with respect to each other, the apertures 17 in one pair of frame pieces 16a and 16b will be in registration with the body member aperture 12 or 13. When mounting the complemental frame pieces 16a and 16b on the body member 11, the apertures 17 thereof are arranged coincident to one another and are, in turn, adapted to register with the corresponding aperture 12 or 13 formed in the body member. The term register, in this instance, is intended to mean that the aperture 17, formed in the frame piece, is disposed within the area defined by the body member aperture.

Mounted in spaced relation on the upper and lower portions of the peripheral edge of each frame piece and extending transversely therefrom in the same direction are pairs of resilient tabs 18 and 20, respectively, heretofore mentioned. The tabs 20 are spaced relatively close to one another so that, when a pair of frame pieces are mounted on the body member with respect to one body member aperture, the tabs 20 will nest between the pair of tabs 18. The pairs of tabs 18 and 20 are adapted to resiliently engage or clip on the corresponding edges 21 and 22 of the body member 11. Mounted on and projecting transversely from the surface of each frame piece and in substantially the same direction as the tabs 18 and 20 are a pair of elongated guides or ribs 23 and 24. The guides, in this instance, are arranged in parallel relation with respect to one another and are disposed adjacent opposite sides of the frame piece aperture 17, as seen more clearly in Fig. 5. When a frame piece is mounted on the body member, the guides 23 and 24 project into the body member aperture 12 or 13 and are adapted to have the corresponding ends 25 thereof engage the serrated edge portions 14 of the body member. The ends 25 of the guides extend beyond the periphery of the aperture 17 and are shaped so that they properly seat in the serrations 14a, 14b, and 14c, see Fig. 7. The serrations 14a, 14b, and 14c enable the pairs of frame pieces to be moved relative to body member, either toward or away from each other depending upon the range at which the principal object was photographed. The number of serrations formed in the periphery of the apertures 12 and 13 may be increased, if desired, so that a wider variance in the space between the pairs of frame pieces may be obtained. The opposite corresponding ends 26 of the guides 23 and 24, as seen in Fig. 5, terminate at substantially midway between the top and bottom peripheral edges of the aperture 17. Thus, when the complemental frame pieces 16a and 16b are mounted on the body member 11, the guides of each frame piece cooperate with one another to form one continuous guide along each side of the coincident apertures 17 and extend the full height of the body member apertures 12 or 13. The guides 23 and 24 of a pair of frame pieces are relatively spaced with respect to each other so as to receive one of the pair of transparencies 27. As seen in Fig. 5, the transparency 27 is sandwiched or placed between a pair of transparent members 28a and 28b formed of glass or some other nonpolarizing material. The width of the pieces 28a and 28b and the transparency 27 are substantially the same as the distance between the adjacent surfaces of the guides 23 and 24, thus the sandwiched transparency 27 cannot move sidewise relative to the guides once it has been positioned therebetween. The height of the sandwiched transparency is substantially the same as the height of the body member aperture, see Fig. 6. The extent to which the guides 23 and 24 extend transversely from the surface of the frame is substantially the same as the thickness of the body member and the latter, in turn, is substantially the same as the thickness of the transparency when sandwiched between the pieces 28a and 28b.

A modified form of frame piece 30, shown in Fig. 8, is of substantially the same construction as the frame piece heretofore described, except that new guides 31 and 32 are provided which comprise two spaced parts A and B. Part A extends beyond the periphery of aperture 17 and is adapted to engage the corresponding serrated edge portion of the body member. Part B, on the other hand, is spaced from part A and is disposed along the periphery of the aperture 17, as seen in Fig. 8. When one face piece 30 of a pair is inverted with respect to the other face piece, the corresponding parts A and B in each piece will cooperate to form parallel guides which extend continuously the full height of aperture 12 or 13 as in the case of the frame pieces 16a and 16b heretofore described.

In assembling the mount 10, the operator first positions one of the frame pieces 16a or 16b on the body member so that the guides 23, 24, or 31 and 32 project into one of the apertures 12 or 13 formed in the body member and the ends 25 of the guides engage the proper set of serrations. The serrations, if so desired, may be marked, not shown, so as to aid the viewer in positioning the pairs of frame pieces at their correct relative distance. The transparency 27 sandwiched between pieces 28a and 28b is then positioned between the guides and between the top and bottom peripheral edges of the aperture 12 or 13. The complemental frame piece of the pair is then mounted on the body member so that the guides thereof embrace opposite sides of the sandwiched transparency and engage the corresponding set of serrations formed along the opposite peripheral edge of the body member aperture. The same procedure is then followed for mounting the other pair of frame pieces with respect to the other aperture formed in the body member. If necessary, the pairs of frame pieces may then be further adjusted relative to one another until comfortable viewing of the transparency is obtained.

While the mount has heretofore been discussed for use solely with transparencies, it is believed that such mount might also be used when observing photographs taken in three dimension. Furthermore the use of a pair of frame pieces in combination with a body member having but a single aperture, to be used in observing a slide taken in two dimensions is believed to come within the scope of this invention. It is to be further noted that while the serrations 14a, 14b, and 14c are shown as formed on the aperture-forming edges of the body member 11, it is believed that similar serrations, not shown, might be formed on the edges 21 and 22 of the body member and be engaged by the sets of tabs 18 and 20. In such a case, the serrations 14a, 14b, and 14c, as shown in Fig. 1, might be omitted, whereby the ends 25 of the guides 23, 24, or 31, 32 could be made flat instead of pointed.

Thus, it will be seen that a mount for stereoscopic film has been provided which enables the distance between the transparencies, being viewed, to be varied depending upon the distance the principal object being photographed is with respect to the camera lens, so as to insure comfortable viewing of the transparencies when the latter are observed through a stereo viewer or are projected with a stereo projector. Furthermore, a single inexpensive mount may be used for numerous sets of transparencies having the ranges of the principal object being photographed varying widely.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A stereoscopic film mount comprising an elongated substantially flat body member provided with a pair of longitudinally spaced apertures formed therein, a portion of the aperture-forming edge of each aperture being provided with a plurality of longitudinally spaced serrations, a pair of apertured frame pieces detachably mounted on said member for sandwiching the film between said body member and said frame pieces, said pieces having yieldable lip portion for snap-on engagement with the periphery of said body member whereby the aperture in each frame piece registers substantially with a corresponding aperture formed in said body member, and locking means carried on and protruding from each frame piece for projecting into the corresponding body member aperture and selectively engaging one of the longitudinally spaced serrations provided on the aperture-forming edge of said body member to effect locking of said frame piece in various predetermined positions against sliding movement with respect to said body member, the longitudinal spacing between said frame pieces being dependent upon the serrations selectively engaged by said locking means.

2. A stereoscopic film mount comprising an elongated substantially flat body member having a pair of longitudinally spaced apertures formed therein, aperture frame pieces detachably mounted on said member in selected positions of longitudinal adjustment, the piece apertures and the member apertures being in substantial registered relation, first means disposed on said body member, and second means disposed on each of said frame pieces and cooperating with said first means to effect locking of said frame pieces on said body member at said selected positions of adjustment; one of said means including a plurality of linearly arranged positioning elements and the other means including a complemental element for selective engagement with predetermined positioning elements.

3. A stereoscopic film mount comprising an elongated substantially flat body member having a pair of longitudinally spaced apertures formed therein, an apertured frame piece for each member aperture detachably mounted on said member at only a plurality of selected positions of longitudinal adjustment whereby the piece aperture and the corresponding member aperture are in substantial registered relation, the longitudinal spacing between said mounted frame pieces being dependent upon which of said positions are selected, first means disposed on said body member in proximity to the longitudinally spaced apertures formed therein, and second means disposed on said frame pieces and cooperating with said first means to effect locking of said pieces against longitudinal slidable movement with respect to said member only when said pieces are in a selected position; one of said means including linearly arranged serrations and the other means including a detent for disposition intermediate adjacent serrations.

References Cited in the file of this patent

UNITED STATES PATENTS

| | | |
|---|---|---|
| 1,013,815 | Richard | Jan. 2, 1912 |
| 2,088,944 | Young | Aug. 3, 1937 |
| 2,110,475 | Schubert | Mar. 18, 1938 |
| 2,132,670 | Young | Oct. 11, 1938 |
| 2,338,189 | Libby | Jan. 4, 1944 |
| 2,527,765 | Roehrl | Oct. 31, 1950 |
| 2,599,382 | Goldberg | June 3, 1952 |